Aug. 25, 1953  S. L. CHRISTIE ET AL  2,650,339
BATTERY CHARGING APPARATUS
Filed Sept. 15, 1951
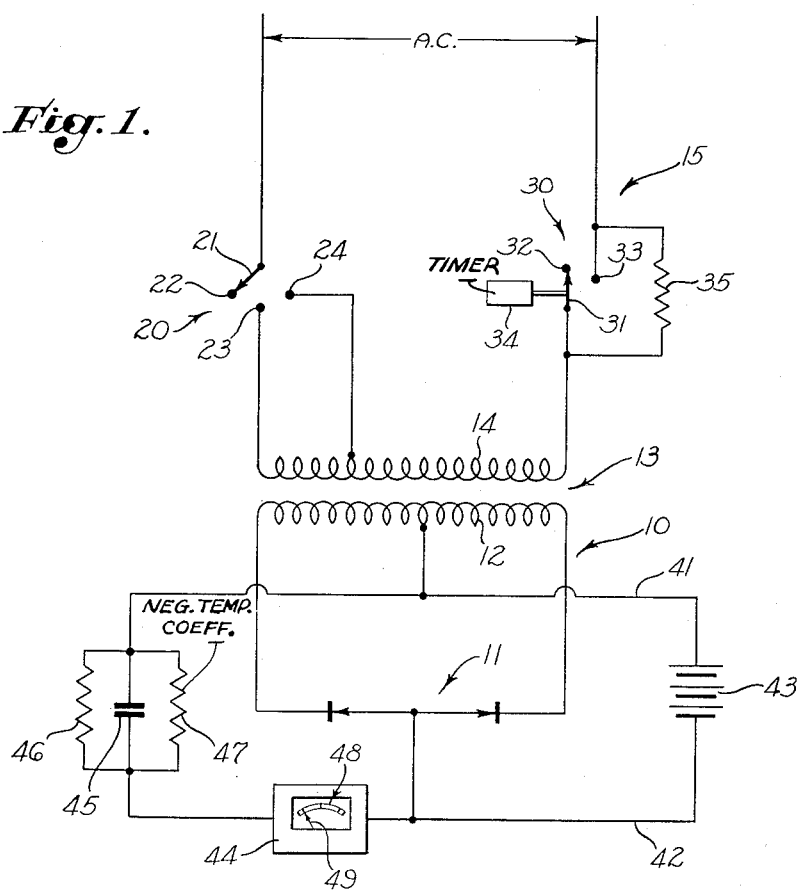
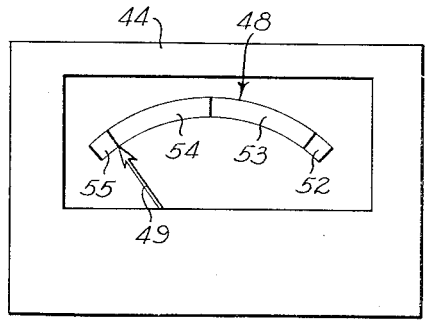
INVENTORS.
SOREN L. CHRISTIE
FRANK C. MARSHALL
BY THEIR ATTORNEYS.
HARRIS, KIECH, FOSTER & HARRIS Patented Aug. 25, 1953

2,650,339

UNITED STATES PATENT OFFICE 2,650,339

BATTERY CHARGING APPARATUS

Soren L. Christie and Frank C. Marshall, Los Angeles, Calif., assignors to McColpin-Christie Corp., a corporation of California Application September 15, 1951, Serial No. 246,748

21 Claims. (Cl. 320—23)

The present invention relates to an apparatus for charging storage batteries and a primary object thereof is to provide a battery charger which substantially automatically adjusts the charging current to the condition of the battery being charged, e. g., the state of charge of the battery, the age of the battery, the temperature conditions under which the battery is being charged, and the like.

The most generally applied method of charging storage batteries at present is to employ a charger having a current indicator and a control for varying the charging current. In accordance with such prior practice, the control is adjusted to provide a given charging current, regardless of the condition of the battery. If the current is more than the plates of the battery can absorb, the excess results in heating and gassing of the battery. Frequently, batteries are damaged by such treatment and the present invention avoids such damage by adjusting the charging current to the condition of the battery, which is an important feature.

Important objects of the invention are to provide a battery charger which is simple and inexpensive and which requires no special skill to operate so that anyone can use it.

Another important object of the invention is to provide a battery charger having a meter provided with a scale which is divided into coded zones indicative of the voltage applied to the battery, and having control means movable through a range of coded positions for varying the voltage applied to the battery, the coding of such positions corresponding to the coding of the zones on the meter scale, respectively. Thus, all the operator has to do is to set the voltage control means in a position corresponding to the indication of the meter with complete assurance that the charging current will then be adjusted to the condition of the battery, which is an important feature of the invention.

Another important object is to provide a battery charger having automatic temperature compensating means which causes the indication provided by the meter to vary with the ambient air temperature so as to adjust the applied voltage to compensate for the effects of temperature on the ability of the battery to absorb charging current.

Another object is to provide a charger which automatically compensates for variations in line voltage.

Other objects of the invention are to provide a charger wherein the meter automatically indicates open or reversed connections to the battery. These features are quite important since they provide a charger which does not require an ammeter, thus reducing the cost of the charger and simplifying operation thereof.

Another important object is to provide means for automatically reducing the charging rate after charging the battery for a predetermined period of time at a higher rate.

Another object is to provide a battery charger which includes a rectifier circuit having a voltmeter and a condenser connected in series across its output, a resistor being connected in parallel with the condenser and in series with the voltmeter. The charger also includes means for connecting the battery to be charged across the output of the rectifier circuit in parallel with the voltmeter-resistor-condenser circuit. With this arrangement, the higher the resistance in the battery for a given battery E. M. F., the higher the voltmeter indication, and, in the event that there is an open connection to the battery, i. e., an infinite resistance, the voltmeter will go off scale at the upper end of the scale, which are important features of the invention.

With the foregoing general discussion of the invention in mind, the invention will now be considered in detail in connection with the accompanying drawing which illustrates an exemplary embodiment. The foregoing objects and advantages of the invention, together with various other objects and advantages thereof which will become apparent, may be attained with the exemplary embodiment illustrated in the drawing and described in detail hereinafter. Referring to the drawing:

Fig. 1 is a diagrammatic view of the circuit of the battery charging apparatus of the invention; and Fig. 2 is an enlarged view of the scale of a voltmeter incorporated in the circuit of the battery charging apparatus.

Referring particularly to Fig. 1 of the drawing, the numeral 10 designates a rectifier circuit which includes rectifier means 11 and the secondary winding 12 of a transformer 13. The primary winding 14 of the transformer 13 forms part of a power supply circuit 15 which may be connected to a suitable A. C. source.

The transformer 13 is supplied through a switch or switch means 20 which includes a switch element 21 engageable with either of two contacts 23 and 24 and movable to an off or open position 22. The contact 23 is connected to one end of the primary winding 14 and the contact 24 is connected to a point intermediate the ends of the primary winding so that a low voltage is applied to the rectifier circuit 10 when the switch element engages the contact 23 and a high voltage is applied to the rectifier circuit when the switch element engages the contact 24. While the switch means 20 as illustrated is adapted to apply only two voltages to the rectifier circuit 10, it will be understood that this number may be increased if desired, as by providing additional contacts, not shown, connected to different points on the primary winding 14.

The transformer 13 is also supplied through a switch or switch means 30 in the power supply circuit 15, the switch 30 including a movable switch element 31 which has an open position 32 and which is engageable with a contact 33 when in its closed position. The movable switch element 31 is connected to a timing device 34 which is adapted to open the switch 30 after a predetermined interval of time, any suitable timing device being usable. A resistor 35 is connected in parallel with the switch 30. As will be apparent, when the switch 30 is closed, it provides a path of low resistance to the transformer to allow a high current in the rectifier circuit 10. However, when the switch 30 is opened by the timing device 34, the current to the transformer 13 must flow through the resistor 35 thereby providing a low current in the rectifier circuit.

The charging apparatus includes means, exemplified as leads 41 and 42, for connecting a battery 43 to be charged across the rectifier circuit 10, one of the leads being connected to the center tap of the secondary winding 12 and the other being connected to the output of the rectifier means 11. A voltmeter 44 responsive to A. C. and D. C. is connected to the output of the rectifier circuit 10 in parallel with the battery 43, and connected in series with the voltmeter 44 is a condenser 45. Resistors 46 and 47 are connected in parallel with each other and with the condenser 45 and in series with the voltmeter 44, the resistor 47 having a negative temperature coefficient for reasons to be considered hereinafter.

Referring to Fig. 2, the voltmeter 44 is provided with a dial having a scale 48 over which a pointer 49 is movable. The scale 48 is divided into four zones 52, 53, 54 and 55. As will be discussed in more detail hereinafter, when the pointer 49 is over the zone 52, an open connection to the battery 43 is indicated. On the other hand, when the pointer is over the zone 55, reversed connections to the battery are indicated.

For reasons which will become apparent in the description of the operation of the battery charger, the zone 53 corresponds to the contact or position 23 of the switch element 21 and the zone 54 corresponds to the contact or position 24 of the switch element 21, these zones and contacts being coded to indicate this relationship. This may be accomplished in various ways. For example, with the system of reference numerals employed herein, the relationship between the position 23 and the zone 53 is indicated by the code number "3" appearing in both reference numerals. Similarly, the relation between the position 24 and the zone 54 is indicated by the code number "4" appearing in both reference numerals. However, this coding may be obtained in other ways. For example, the position 24 and the zone 54 may both be green and the position 23 and the zone 53 may both be orange. With this color coding system, the zones 52 and 55 for indicating open and reversed connections, respectively, may conveniently be in red.

*Operation*

In considering the operation of the battery charging apparatus, the actual steps required to charge the battery 43 will be considered first. Thereafter, the theory of operation of the charger and various factors affecting the condition of the battery will be considered.

In using the battery charging apparatus, the operator connects the battery 43 to the output of the rectifier circuit 10 by means of the leads 41 and 42. The timing device 34 is adjusted or set to close the switch 30 so as to provide a high rate of charge for the battery, or what is commonly known as "fast charging." The switch 20 is then so adjusted that the switch element 21 engages the contact 24 so as to apply the maximum voltage to the battery through the transformer 13 and the rectifier circuit 10. If, during an initial charging period of, for example, one or two minutes, the pointer 49 of the voltmeter 44 is in the zone 53, the applied voltage is too high, and the operator must move the switch element 21 to the correspondingly coded position 23. However, if, during this initial charging period with the switch element 21 in the position 24, the pointer 49 of the voltmeter 44 is in the correspondingly coded zone 54, the applied voltage is satisfactory and the switch element is left in its initial position.

Thus, it will be seen that all the operator has to do is to set the switch element 21 in the position 23 or 24 whose code corresponds to the code of the zone in which the pointer 49 is disposed during initial charging period. This results in the correct applied voltage and charging current for the condition of the particular battery 43 being charged and for the prevailing line voltage and ambient temperature. Thus, it will be seen that all important factors are taken into account, yet no skill is required to operate the apparatus so that anyone can use it, which is an extremely important feature.

Thus, regardless of the reason or reasons for the excessive applied voltage, which reasons will be discussed in more detail hereinafter, the voltage will be reduced by merely switching from the contact 24 to the contact 23 whenever the pointer 49 is in the zone 53 during the initial charging period. This two-step adjustment is sufficient for most purposes, although, as indicated previously, additional steps may be provided if desired by providing additional contacts for the switch element 21 and additional zones on the meter 44.

Considering a typical numeral example, without limiting the invention thereto, if the charging apparatus is employed to charge an ordinary six volt automotive storage battery, the dividing line between the zones 53 and 54 may correspond to an applied voltage during charging of approximately 7.5 volts at 75° F. Thus, if the battery voltage at the start of charging exceeds approximately 7.5 volts, the meter will read in the zone 53, and, according to instructions, the switching element 21 will be moved to the contact or position 23. Switching from the contact 24 to the contact 23 causes, as discussed above, a reduction of the charging rate and of the applied voltage. After the switch 20 has been set to the proper position, the charging apparatus requires no further attention. As the rectifier circuit 10 is designed with low regulation, the charging rate automatically tapers off as the battery voltage builds up during the course of charging. After a predetermined time, such as, in the case of fast charging, 45 to 60 minutes, the timing device 34 opens the switch 30, thereby causing a reduction in the charging rate from the fast rate to a "slow" rate such as 10 to 15 amperes. It will be understood, of course, that the foregoing values are intended as illustrative values only.

Considering the theory of operation of the battery charging apparatus, and other features thereof, the output of the rectifier means includes A. C. and D. C. components both of which affect the meter 44. The condenser 45 has little influence on the meter reading as long as the A. C. component in the rectifier output is small, which is the case when a normal battery having a low internal resistance is being charged. However, when a battery with a high internal resistance, such as a sulphated battery, is being charged, the A. C. component becomes sufficiently large to cause the meter 44 to indicate in the zone 53 at a lower charger output than with a normal battery. Thus, it will be seen that with this series arrangement for the condenser 45 and the voltmeter 44 in the circuit described, the indication provided by the voltmeter varies directly with the resistance offered by the battery being charged, the coding of the zones 53 and 54 and the contacts 23 and 24 indicating to the operator the proper charging rate to use for the particular battery resistance encountered.

If the battery circuit is open, the A. C. component of the rectifier circuit output becomes large enough to cause a current flow through the condenser 45 which is sufficient to make the voltmeter 44 read off scale, i. e., to cause the pointer 49 to move into the zone 52. Whenever this occurs, the operator is immediately advised that the battery is improperly connected, which is an important feature.

In the event that the connections to the battery to be charged are reversed, the pointer 49 goes off scale at the lower end, i. e., moves into the zone 55, to indicate this fact to the operator.

As previously indicated, the resistor 47 has a negative temperature coefficient. Thus, when the ambient air temperature is high so that the battery temperature is high, the pointer 49 moves into the zone 53 at a lower charging voltage, thereby causing the operator to reduce the charging rate so that the battery will not overheat. On the other hand, when the ambient air temperature is low, corresponding to a low battery temperature, the increased resistance of the negative temperature coefficient resistor 47 permits a higher charging voltage to develop before the pointer 49 enters the zone 53. Thus, the resistor 47 serves as a temperature compensating means for causing the meter to read higher in warm weather than in cold weather.

While the present invention will adjust the charging rate to the battery condition irrespective of the cause of the high charging voltage, it might be well to mention some of the reasons for a high charging voltage. For example, a high charging voltage during the initial charging period may be due to a fully or partially charged battery, to an old or sulphated battery, to a cold battery, or to a high line voltage. Since a sulphated battery has a higher internal resistance than a normal battery, the pointer of the voltmeter 44 enters the zone 53 at a lower charging current than would be the case with a normal battery. The result is that a sulphated battery will be charged at a reduced rate, thereby avoiding overheating and gassing.

However, irrespective of the reason or reasons for high charging voltages and resistances in the load circuit, it will be apparent that with the battery charging apparatus disclosed, the operator merely needs to follow the instructions given him by the meter 44 without worrying about reasons. Thus, if the pointer 49 is in the zone 52, the operator is advised to check his connections. If the pointer enters the zone 55, the operator is advised to reverse his connections. If the pointer moves into the zone 53 during the initial charging period with the switch element 21 in engagement with the contact 24, the operator merely moves the switch element 21 into engagement with the correspondingly coded contact 23. On the other hand, if the pointer 49 is disposed in the zone 54 during the initial charging period, with the switch element 21 in engagement with the correspondingly coded contact 24, he merely leaves the switch element 21 where it is. Thus, as will be apparent, no special skills are required to operate the apparatus, which is an important feature of the invention.

Although we have disclosed an exemplary embodiment of our invention herein for purposes of illustration and have discussed its application to a particular type of battery, it will be understood that other applications of the invention are possible and that the embodiment disclosed may be subjected to various changes, modifications and substitutions without necessarily departing from the spirit of the invention.

We claim as our invention:

1. In a battery charging apparatus, a charging circuit connectible to a battery to be charged and including a meter responsive to the output voltage of said circuit, said meter having a scale with differently coded zones thereon, said circuit also including means for varying the voltage applied to the battery, said means including an element which is movable through a range of coded positions, the coding of said positions corresponding to the coding of said zones, respectively.

2. In a battery charging apparatus, the combination of: a charging circuit connectible to a battery to be charged and including a meter responsive to the output voltage of said circuit, said meter having a scale with differently coded zones thereon; and means for varying said output voltage, said means including an element which is movable through a range of coded positions, the coding of said positions corresponding to the coding of said zones, respectively.

3. An apparatus as defined in claim 2 wherein each of said zones and the position corresponding thereto are coded in the same color.

4. A battery charging apparatus as defined in claim 2 in which said charging circuit includes: a rectifier circuit; means for connecting the battery across the output of said rectifier circuit; and a condenser connected across the output of said rectifier circuit, said meter being connected in circuit with said condenser.

5. An apparatus as defined in claim 4 including a resistor connected in parallel with said condenser and in series with said meter.

6. An apparatus as defined in claim 5 wherein said resistor has a negative temperature coefficient.

7. In a battery charging apparatus, the combination of: a rectifier circuit; means for connecting a battery to be charged across the output of said rectifier circuit; and means connecting a voltmeter and a condenser in series across the output of said rectifier circuit in parallel with the battery to be charged, and connecting a resistor in parallel with said condenser and in series with said voltmeter.

8. In a battery charging apparatus, the combination of: a rectifier circuit and a power supply circuit therefor; means for connecting a battery to be charged across the output of said rectifier circuit; means connecting a voltmeter and a condenser in series across the output of said rectifier circuit in parallel with the battery to be charged and a resistor in parallel with said condenser, said meter having a scale with differently coded zones thereon; and means in said power supply circuit for varying the voltage applied to said rectifier circuit, said means including an element which is movable through a range of coded positions, the coding of said positions corresponding to the coding of said zones, respectively.

9. A battery charging apparatus as defined in claim 8 wherein said power supply and rectifier circuits respectively include the primary and secondary windings of a transformer, the means last defined in claim 8 including switch contacts connected to different points on said primary winding and including a movable switch element engageable with said switch contacts respectively.

10. A battery charging apparatus as defined in claim 8 including a switch and a resistor connected in parallel in said power supply circuit, and including a timing device for opening said switch after a predetermined interval of time, whereby to decrease the voltage applied to said rectifier circuit so as to decrease the voltage applied to the battery.

11. A battery charging apparatus as defined in claim 8 including temperature compensating means connected to the output of said rectifier circuit for causing the indication provided by said voltmeter to vary with ambient air temperature.

12. A battery charging apparatus as defined in claim 11 wherein said temperature compensating means includes a resistor having a negative temperature coefficient in parallel with said condenser and in series with said voltmeter.

13. A battery charging apparatus according to claim 7 including temperature compensating means for causing the indication provided by said voltmeter to vary with ambient air temperature.

14. A battery charging apparatus as defined in claim 13 wherein said temperature compensating means includes a resistor having a negative temperature coefficient connected in parallel with said condenser and in series with said voltmeter.

15. A battery charging apparatus according to claim 7 including a power supply circuit for said rectifier circuit, said power supply and rectifier circuits respectively including the primary and secondary windings of a transformer.

16. A battery charging apparatus according to claim 7 including a power supply circuit for said rectifier circuit, said power supply and rectifier circuits respectively including the primary and secondary windings of a transformer, and said battery charging apparatus including switch means having a movable switch element adapted to engage successive switch contacts, said switch contacts being connected to different points on said primary winding.

17. A battery charging apparatus according to claim 16 wherein said voltmeter is provided with a scale with differently coded zones thereon, said switch contacts being coded also and the coding of said switch contacts corresponding to the coding of said zones, respectively.

18. A battery charging apparatus according to claim 17 including a switch and a resistor in parallel in said power supply circuit, and including a timing device for opening such switch after a predetermined time interval.

19. A battery charging apparatus according to claim 7 wherein said voltmeter is provided with a scale having a zone at the upper end thereof for indicating an open connection to the battery being charged.

20. A battery charging apparatus according to claim 7 wherein said meter is provided with a scale having a zone at the lower end thereof for indicating reversed connections to the battery being charged.

21. In a battery charging apparatus, the combination of: a charging circuit; means for connecting a battery to be charged across the output of said charging circuit; and a voltmeter, a condenser and a resistor connected in circuit across the output of said charging circuit in parallel with the battery to be charged.

SOREN L. CHRISTIE.
FRANK C. MARSHALL.

References Cited in the file of this patent

UNITED STATES PATENTS

| Number | Name | Date |
|---|---|---|
| 775,732 | Pape | Nov. 22, 1904 |
| 1,356,753 | Andrews | Oct. 26, 1920 |
| 1,435,132 | Midgley, Jr. | Nov. 7, 1922 |
| 2,161,495 | Witte | June 6, 1939 |
| 2,226,185 | Sturm et al. | Dec. 24, 1940 |
| 2,347,452 | Amsden | Apr. 25, 1944 |
| 2,354,877 | Peters | Aug. 1, 1944 |
| 2,421,828 | Bruney | June 10, 1947 |
| 2,431,707 | Pugh | Dec. 2, 1947 |
| 2,432,068 | Pugh | Dec. 2, 1947 |
| 2,478,279 | Kochenburger | Aug. 9, 1949 |